No. 836,540. PATENTED NOV. 20, 1906.
H. SMITH.
COMBINED HARROW AND CULTIVATOR.
APPLICATION FILED SEPT. 13, 1905.
2 SHEETS—SHEET 2.
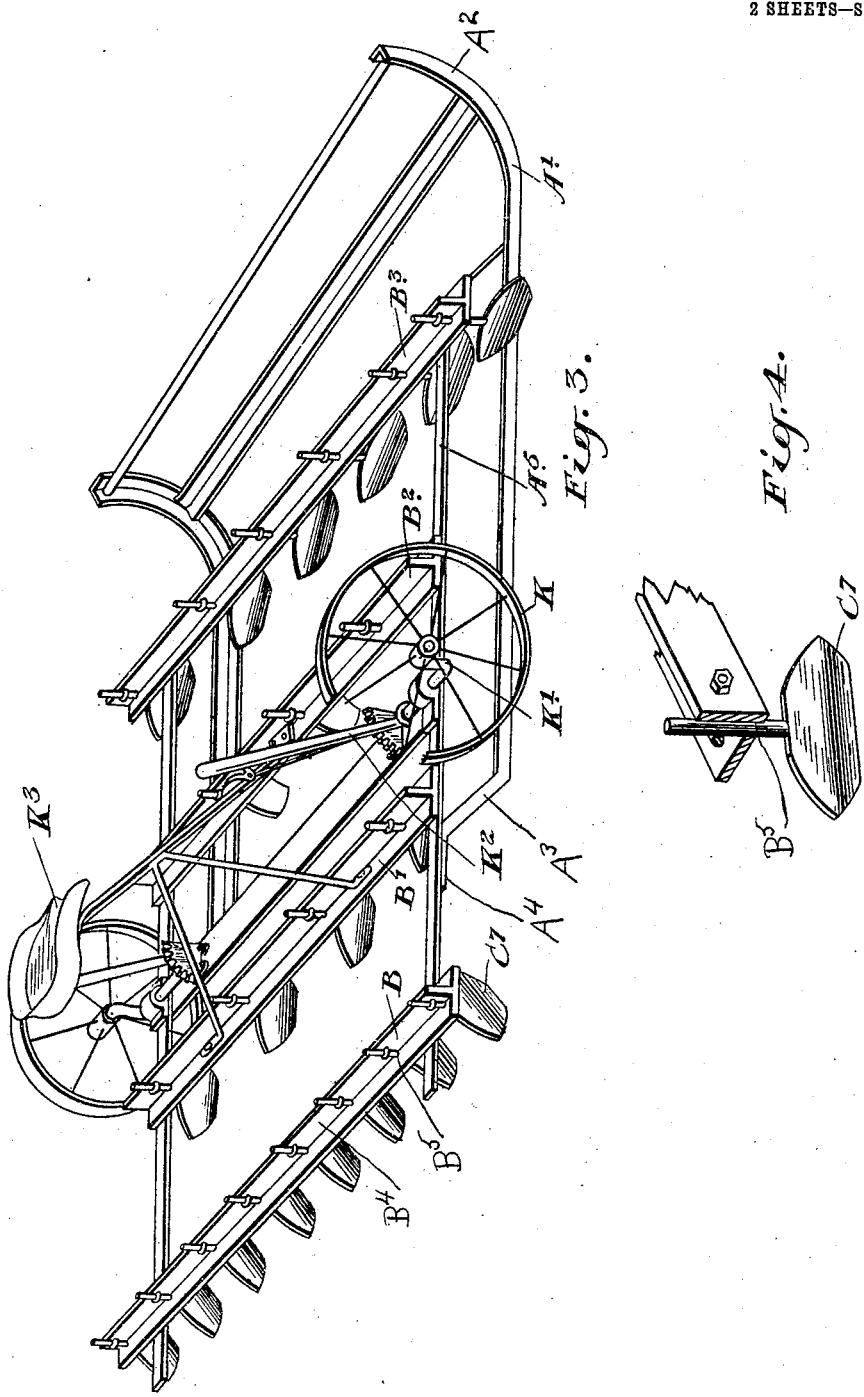
Witnesses
Inventor.
Henry Smith.

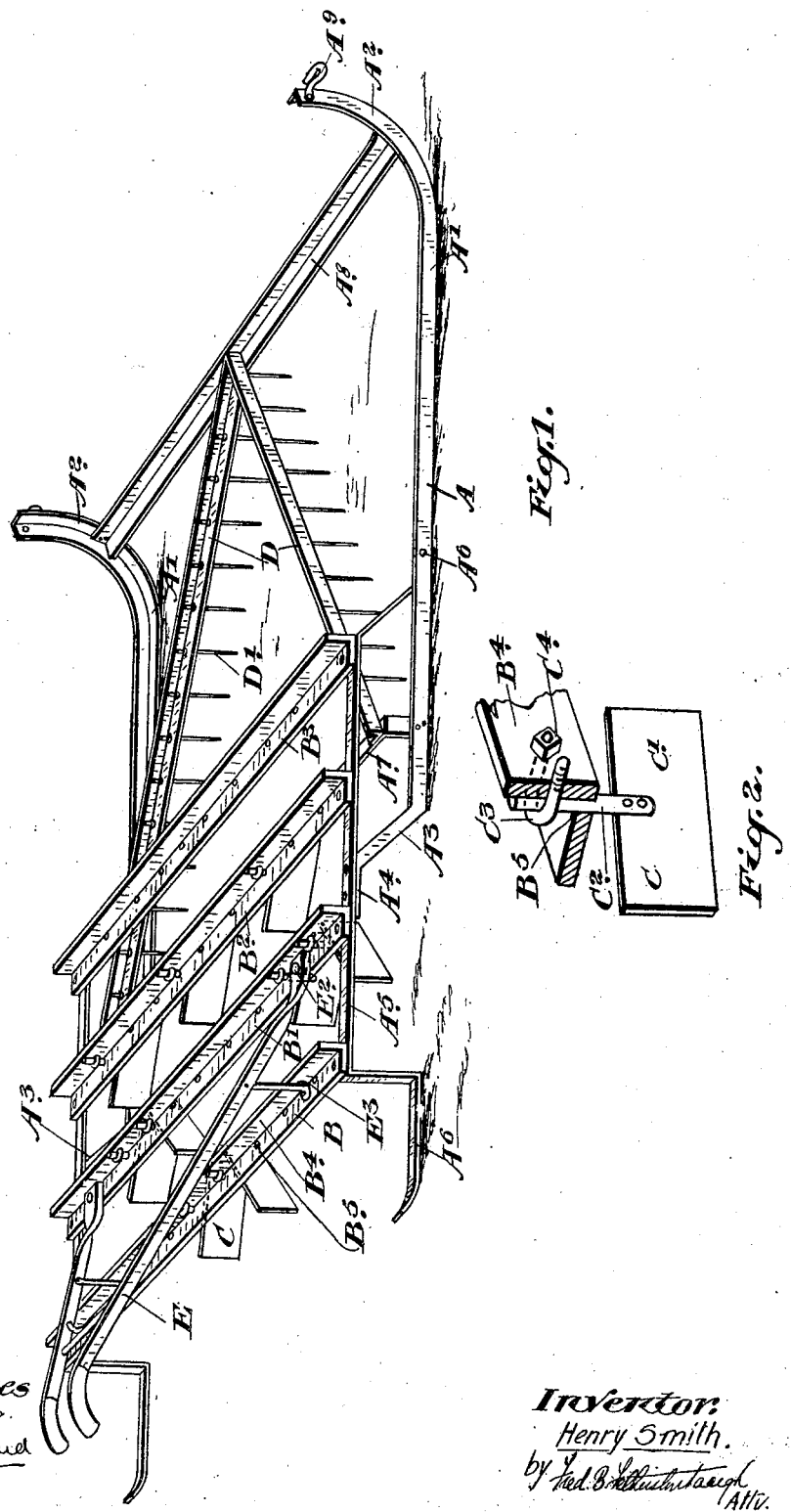

UNITED STATES PATENT OFFICE.

HENRY SMITH, OF WALLACE TOWNSHIP, ONTARIO, CANADA.

COMBINED HARROW AND CULTIVATOR.

No. 836,540.  Specification of Letters Patent.  Patented Nov. 20, 1906.

Application filed September 13, 1905. Serial No. 278,259.

*To all whom it may concern:*

Be it known that I, HENRY SMITH, farmer, of the township of Wallace, in the county of Perth, in the Province of Ontario, Canada, have invented certain new and useful Improvements in a Combined Harrow and Cultivator, of which the following is a specification.

My invention relates to improvements in combined harrows and cultivators; and the object of the invention is to provide a simple and easily-operated machine for the purpose of top-soil cultivation and for the thinning and bunching of root crops sown in drills; and a subsidiary object is to provide means whereby the harrow-teeth and hoe-blades of the machine may be raised from a lower level to a higher level in the main frame and set to any desired angle to the machine when desired; and it consists, essentially, of two longitudinal supporting bars or runners having a raised bridge portion intermediate of it length, cross angle-bars secured on the top of such bridge portion and extending from runner to runner, a V-shaped angle-bar harrow-frame secured to bars connecting the front portion of the harrow together, hoe-blades provided with shanks extending through the cross-bars and harrow-teeth extending through the V-shaped frame, and U-bolts extending around the shanks of the harrow-teeth and hoe-blades through the flange of the angle-bar, the parts being otherwise arranged and constructed in detail as hereinafter more particularly explained by the following specification.

Figure 1 is a general perspective view of my combined harrow and cultivator. Fig. 2 is an enlarged detail view of the means whereby the hoe-blades are adjustably secured to their supporting-bars. Fig. 3 is an alternative view of my machine adapted for flat-land cultivation. Fig. 4 is a detail of an alternative form of hoe used in the construction shown in Fig. 3.

In the drawings like letters of reference indicate corresponding parts in each figure.

A is the main frame of the harrow, composed of the side angle-bars or runners $A'$ $A'$, having the upturned front ends $A^2$ and the upturned rear ends $A^3$, having a horizontal portion $A^4$.

$A^5$ is a flat iron bridge-bar secured in the front to the side of the angle-bar or runner at $A^6$ and intermediately of its length to the portion $A^4$ of the runner. The rear end of the portion $A^5$ is turned down and rests on the ground in the form of a back runner $A^6$.

B, $B'$, $B^2$, and $B^3$ are angle-iron cross-bars extending from the bridge portion $A^5$ of one runner to the bridge portion $A^5$ of the other runner and having the flanges $B^4$ thereof extending upwardly.

$B^5$ represents a series of holes located in the base-flanges of the angle-bars B, $B'$, $B^2$, and $B^3$.

C represents a series of hoe-blades comprising a plate $C'$ and shank $C^2$, extending through the holes $B^5$ of the cross-bars B $B'$ $B^2$ $B^3$.

$C^3$ represents U-bolts extending around the shank $C^2$ and through the vertical flange $B^4$, in which they are secured by nuts $C^4$, as shown in detail in Fig. 2 of the drawings.

The hoes $C'$ are arranged on the bars B and $B'$ alternately and in pairs, the blades of each pair being set obliquely toward each other in the front, leaving an opening or space between the front portions of the hoe-blades. By arranging the hoe-blades alternately on the bars B and $B'$ the earth is prevented from collecting between the two pairs of blades and choking the machine, as would be the case if the two sets were located in one bar. On the cross-bar $B^2$, I secure hoe-blades located centrally between the hoe-blades on the bars B and $B'$. The bar $B^3$ is used for a purpose which I will hereinafter describe.

$A^7$ and $A^8$ are cross-bars connecting the central and front portions of the runners together.

D represents angle-bars extending from the ends of the bars $A^7$ to the center of the bar $A^8$, to which they are secured, forming with the bar $A^7$ a triangular frame in which are secured the harrow-teeth $D'$ in a similar manner to the hoe-blade C.

$A^9$ represents hooks secured to the front end of the runners $A'$ and to which the horses are attached.

E represents the handles, secured to the cross-bar $B'$ by bolts $E^2$ and by stays $E^3$ to the cross-bar B.

Having described the principal parts involved in my invention, I shall briefly describe the operation of the same. It will be understood that my device is particularly adapted for the cultivation of roots sown in drills. When it is desired to thin and bunch the plants and otherwise cultivate the soil, I draw my machine across the field at right angles to the drills. By this means the hoes located in the bars B and B' cut the plants out of the ground to each side of them, leaving a bunch which passes through the opening left at the apex of the angle formed by each pair of inclined hoe-blades. The hoe-blades located on the bar $B^2$, and being located intermediately between each pair of blades on the bars B B' cut out the plants left between the bunches so formed. If it is desired to locate the bunches farther apart, the bars $B^3$ may be used to support hoe-blades to operate in the increased space. The harrow-teeth serve to break the ground when it becomes dry and crusted, leaving it in condition to be operated on by the hoes. By loosening the bolts $C^4$ the hoes may be turned to any desired angle or raised to any height to suit the various conditions of the soil and plants to be cultivated.

It will be seen from this description that by the use of my machine a great saving in manual labor is effected and that by the use of runners to support the harrow-teeth and hoes the machine passes over the surface of the ground without disturbing the roots of the plants which it is desired to leave in the ground. The harrows being elevated allow of the top soil being cultivated only without disturbing the roots, the hoe-blades assisting in the cultivation and thinning out the plants and bunching the same at such intervals as may be desired.

In Fig. 3 I show my cultivator adapted to the cultivation of flat land. In this form I show the flat iron $A^5$ extending forwardly to near the front portion of the runners A'. The cross-bars B B' $B^2$ $B^3$ are formed of T-iron and are located at a greater distance apart in this form. $C^7$ represents hoe-blades of a slightly concave form and are cut off cornerwise to form pointed ends. This form is adapted to cut the ground, and the pointed ends prevent the gathering of weeds and grass on the end of the hoe. K represents wheels for supporting and adjusting the height of the rear portion of the machine. The wheels K are journaled on crank-rods K', journaled on the frame of the machine and operated by a coacting quadrant and lever $K^2$. $K^3$ is a seat suitably supported in the bars B' and $B^2$. The hoes $C^7$ are arranged at alternate angles in each bar, respectively, and are differently spaced on each bar, so as to thoroughly cultivate the soil. The bars B and $B^3$ extend over the sides of the machine and hoes are secured in the extending portion, the hoe on the bar B serving to cultivate the soil which has passed beneath the runner and the hoe on the bar $B^3$ serving to level the land to form a track for the wheels K.

What I claim as my invention is—

1. A cultivator comprising side runner-bars having raised bridge portions attached at their front ends intermediate of the length of the runners and extending rearwardly thereof and having a terminal back runner, cross connecting-bars between the bridge portions and hoe-blades secured thereto, as and for the purpose specified.

2. A cultivator comprising side runner-bars, cross connecting-bars between the rear portion of the runners, hoe-blades secured thereto, a triangular frame located between the front portion of the runners and harrow-teeth secured therein, as and for the purpose specified.

3. A cultivator comprising side runner-bars having a raised bridge portion intermediate of its length, cross connecting-bars between the bridge portions, cross-bars connecting the runners, two rearwardly-diverging bars secured at their front and rear ends to the cross-bars, harrow-teeth secured to the said bars and hoe-blades secured to the cross-bars connecting the bridge portions of the runners, as and for the purpose specified.

4. A cultivator comprising side runner-bars, hoe-blade-supporting means connected thereto, a triangular frame located between side bars and harrow-teeth secured therein, as and for the purpose specified.

5. In combination, the side runners, a front cross-bar, a triangular frame connected to the front cross-bar and to the side runners, bridge portions connected to the side runners and extending in rear thereof and the hoe-supports connected with the said bridge portions, substantially as described.

HENRY SMITH.

Witnesses:
I. H. ROLLS,
E. SARGENT.